(12) United States Patent
Rogers (10) Patent No.: US 7,303,800 B2
(45) Date of Patent: Dec. 4, 2007

(54) INTERLOCKING MAT

(76) Inventor: D. Scott Rogers, 309 Foreman Dr., Lafayette, LA (US) 70506

( * ) Notice: Subject to any disclaimer, the term of this patent is extended or adjusted under 35 U.S.C. 154(b) by 419 days.

(21) Appl. No.: 10/394,641

(22) Filed: Mar. 21, 2003

(65) Prior Publication Data

US 2004/0005430 A1    Jan. 8, 2004

Related U.S. Application Data (60) Provisional application No. 60/366,729, filed on Mar. 22, 2002.

(51) Int. Cl.
*B32B 3/10* (2006.01)

(52) U.S. Cl. .......................... 428/44; 428/99; 428/100; 411/521; 411/522; 411/510; 52/177; 404/34; 404/36; 404/40; 404/41

(58) Field of Classification Search ................ 428/99, 428/100, 44; 411/521, 522, 510; 52/177; 404/34, 36, 40, 41
See application file for complete search history.

(56) References Cited

U.S. PATENT DOCUMENTS

| | | | |
|---|---|---|---|
| 1,233,200 A | 6/1917 | Dessau | |
| 1,472,521 A | 10/1923 | Harrison | |
| 1,473,767 A | 11/1923 | Healy | |
| 1,581,345 A | 7/1926 | Healy | |
| 4,289,420 A | 9/1981 | Davis | |
| 4,462,712 A | 7/1984 | Penland, Sr. | |
| 4,600,337 A | 7/1986 | Sarver | |
| 4,629,358 A | 12/1986 | Springston | |
| 4,875,800 A | 10/1989 | Hicks | |
| 4,889,444 A | 12/1989 | Pouyer | |
| 4,973,193 A | 11/1990 | Watson | |
| 5,653,551 A | 8/1997 | Seaux | |
| 5,667,866 A * | 9/1997 | Reese, Jr. | 428/116 |
| 5,888,612 A | 3/1999 | Needham | |
| 6,214,428 B1 | 4/2001 | Henderson | |
| 6,474,905 B1 | 11/2002 | Smith | |
| 6,511,257 B1 * | 1/2003 | Seaux et al. | 404/34 |

\* cited by examiner

Primary Examiner—Patrick Joseph Ryan
Assistant Examiner—Jane Rhee
(74) Attorney, Agent, or Firm—Len R. Brignac

(57) ABSTRACT

An mat system with each mat having sloping lips which overlap with an adjacent mat's sloping lips and are secured by interlocking joints in the mats' lips and/or by captive locking pins to form an easily assembled and interconnected flat surface. In use, opposing ledges forms a slot within holes in the top overlapping lips to receive a captive locking pin. The pin is captive by mid body prongs which fix underneath the ledges in a mat's upper lip's holes, and the pin locks and unlocks with rotary turning of the pin resulting in the pin's keeper feet fixing underneath the similar ledges in the holes of the lower lip of an adjacent mat.

13 Claims, 6 Drawing Sheets

INTERLOCKING MAT

CROSS REFERENCE

The present application is based on Provisional Application, Ser. No. 60,366,729, filed Mar. 22, 2002.

BACKGROUND

1. Field of the Invention

The present invention relates to portable interlocking mats to be used as structural supports by persons or equipment. With multiple mats fastened together, the interlocking mats can be used to provide temporary structural support for a variety of uses, including, but not limited to, building floors, walkways and other uses.

2. Description of Related Art

Mats, utilized in a variety of embodiments, have long been used for the construction of temporary support surfaces. A few examples of patents that disclose various mat systems are as follows:

U.S. Pat. No. 6,214,428B1(A laminated wooden support mat fitted with one or more wear mat or pad and are bolted together);

U.S. Pat. No. 4,289,420 (A wooden mat to form a roadway from interlocking mats, each mat being formed from a plurality of layers or boards, each layer being formed from boards parallel to each other and perpendicular to boards forming the adjacent layer, the layers being fastened together at points of intersection by screw shank nails or other fastening means.);

U.S. Pat. No. 4,875,800(A temporary support structure with a plurality of panels. Each panel includes a first row of boards arranged in parallel side-by-side relationship, and a second row of boards arranged in parallel side-by-side relationship. The second row of boards is superimposed on the first row of boards and oriented perpendicularly thereto. A first plurality of panels defines a lower layer in which the second row of boards extends upwardly to define lower locking boards. A second plurality of panels defines an upper layer resting upon the lower layer wherein the second row of boards thereof extends downwardly to define upper locking boards intermeshed with the lower locking boards. Individual panels of the upper layer are intermeshed with a plurality of lower panels to create an interlocking relationship therewith.);

U.S. Pat. No. 4,973,193 (matting system includes interlocking mats of four differing configurations. Each mat configuration consists of wooden boards fastened together to create from one to three layers of boards at various areas of the individual mats. When interlockingly installed a desired area is uniformly covered with three layers of boards. The upper, working layer of boards, bears the vehicular traffic or equipment placement. The middle, intermediate layer of boards, consists of interlock boards which fittingly interlock with corresponding spaces of adjacent mats, and, interspace boards to reinforce the weight bearing characteristics of the mats. The lower, contact layer of boards, rest upon the terrain. Within a layer the boards are parallel to one another, whereas the boards of each layer are perpendicular to the boards of any adjacent layer. When installed each mat interlockingly overlaps or underlaps approximately one-third of the width and one-half of the length of laterally adjacent mats. Both lateral and longitudinal relative movement of any installed mat is substantially precluded by a portion of each mat unit being in frictional engagement with the terrain, by a portion of each mat unit overlapping interlocking with adjacent mats and all three layers of each mat laterally and longitudinally abutting other mats which are also in frictional engagement with the ground.)

U.S. Pat. No. 4,462,712 (A flooring system for use at a construction site such as an oil well drilling site. The flooring system is formed by interlocking a plurality of flooring units. Each of the flooring units includes a rectangular base section and a surface section attached to and overlaying the base section. One end of the rectangular base section is aligned with one end of the surface section which has at least one open-ended locking slot along its length. Located on the opposing end of the surface section is at least one locking tab formed from the surface section and projecting beyond and above the edge of the base section. The locking tab is aligned with the locking slot of the flooring unit).

Additionally, fastening devices are known to interconnect and secure flat shaped components such as mats. For example, U.S. Pat. No. 4,604,962 discloses an interlocking assembly for modular loading dock units.

Any successful interlocking mat system used for support surfaces must provide substantial holding strength to prevent lateral and vertical separation of the mats. Existing devices to secure such mats include fasteners with carriage bolts or other locking elements. These known locking devices must be separately installed after the interlocking mats are arranged in the preferred configuration. The use of separately installed locking devices complicates the installation process; requiring separate transportation and storage and accounting of the locking devices from the mats. The locking devices can become lost or work their way out of the mats presenting a hazard to personnel and vehicles using the mats. Additionally, many fastening devices contain threaded components or moving parts which can result in contaminants such as mud, sand and debris to impair the operation of such working mechanisms.

SUMMARY

The present invention is an interlocking mat system with uniformly sized mats which are joined together to form temporary support structures for a variety of uses, including but not limited to, temporary building floors, walkways and other support functions. The interlocking mat is preferably made by one piece injection molding method with rigid polymeric plastic materials. The mat's edges are recessed to form two upper lips and two lower lips to allow for the overlapping of the upper lip of one mat with the lower lip of an adjacent mat and the lips can include interlocking joint such as a tongue and groove type joint.

The mat's lips can have openings at spaced intervals for alignment with openings in overlapping mats to receive a locking pin which passes through the two aligned openings of overlapping mats. The interlocking mat's recessed lips can slope downward on two adjacent sides and slope upward on the two opposing sides of the mat. The sloping lips sections are integrated into the body of the mat and formed during the injection molding manufacturing process and do not require further assembly. The sloped lips allow for multiple mats to be fitted together with the downward sloping lip mating with an adjacent mat's upward sloping lip forming interlocking series of mats.

With existing mats, the recessed lips are typically subject to the greatest stress at the recessed lip and riser junction resulting in deformity and breakage of the lips. Sloping recessed lips are thickest at the recessed lip and riser junction providing greater strength at this junction improving the durability and usefulness of the mats. The slope design minimizes bending stresses occurring in the lip from cantilever loading or other types of bending loads.

The recessed lips each are secured by interlocking joints in the mats' lips. In the preferred embodiment, each lip has uniformly sized and spaced groove and interspaced ridges which engage in a tongue and groove manner when the lips are overlapped providing interlocking feature to prevent lateral separation of the mats.

The pins are made of one-piece construction and do not have any threaded elements or moving parts that can become impaired by contaminants. The pin has a rigid structure with an enlarged head to fit in the countersunk top opening of the upper lip. Opposing ledges, located at mid depth of the openings, form a slot within the openings and provide a countersunk top openings. The pin has a pair of opposing prongs extending perpendicular from the pin's midbody and a pair of opposing feet which form a keeper at the base of the pin extending perpendicular from the pin's body and offset preferably 90 degrees from the midbody prongs.

After insertion of the pin in the top-overlapping mat, the keeper feet pass through the slot in the upper lip with the offset midbody prongs stopping on top of the ledges of the upper lip's opening. A 90 degree rotary turn of the pin allows the midbody prongs to fit through the slot in the upper lip's opening and the head of pin to drop into the countersunk top opening. The midbody prongs are then positioned below the ledges of the upper lip's opening. A subsequent 90 degree rotary turn of the pin positions the midbody prongs underneath the ledges in the upper lip securing the pin in the mat. The mat, with its captive pin, is positioned over an aligned opening of a lower lip offset with an adjacent mat. The keeper is aligned to pass through the slot formed by ledges mid-depth in the opening of the adjacent mat's lower lip. A 90 degree rotary turn of the pin positions the keeper beneath the ledges in the lower lip of the adjacent mat fastening the two mats together by the head of the pin contacting the top of the ledges of the upper lip of one mat and the keeper contacting the bottom of the ledges of the lower lip of an adjacent mat. The pin is preferably operated by tool which engages a recess in the head of the pin to more easily turn the pin. The recess is preferably formed by a central longitudinal bore in the pin's body.

The interlocking mat can be made from well-known plastic materials, rubber, metal or any other moldable and/or castable materials. Preferably the injection molding forms a cellular structure formed by vertical walls within the mat's interior body providing optimum strength with material saving benefits. Filler component sized to fit in cellular openings can be inserted into some or all openings in the cellular structure to increase the mat's load bearing capabilities. The filler components are sized to fit within individual cells and preferably made of the same materials as the mat.

BRIEF DESCRIPTION OF THE DRAWINGS

FIG. 8 is a cross-sectional perspective view taking along the lines of B-B of FIG. 5a.

FIG. 8a is a cross-sectional elevation view taken along the lines of B-B of FIG. 5a.

DETAILED DESCRIPTION OF THE INVENTION

Figure 1:
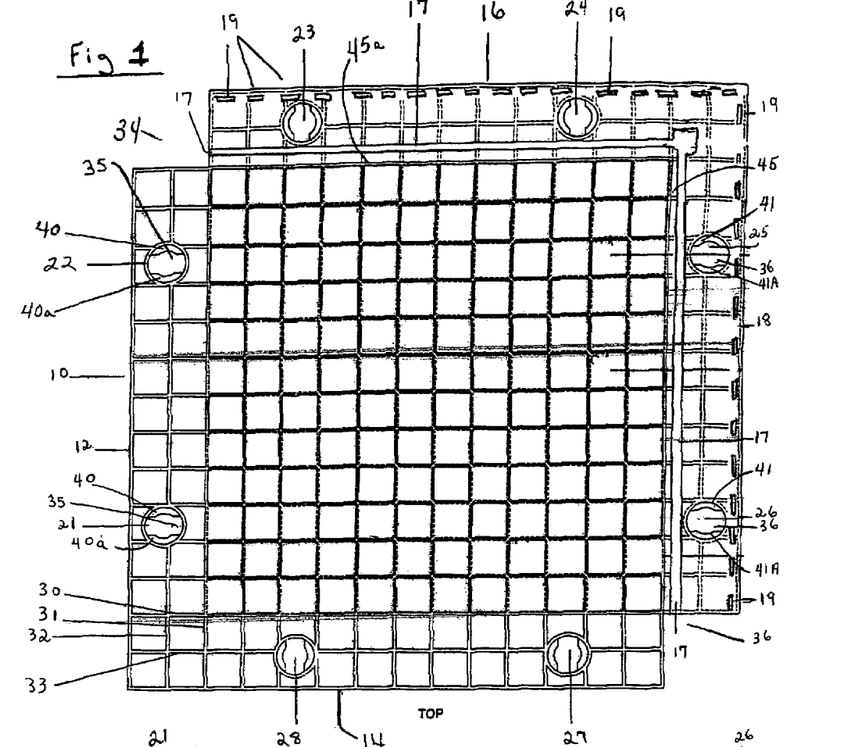
FIG. 1 shows a top view of a mat.

The present invention relates to an improved temporary load bearing structure having a collection of rigid mats with overlapping recessed lips to be fitted together to form a continuous flat interlocking load bearing surface. In FIG. 1, each mat 10 is made of rigid material preferably rigid polymeric plastic materials, rubber or any other moldable and/or castable material. The mat preferably is sized approximately 4'×4' in length and width, approximately 2½ to 3 inches in height and weighs approximately 50 lbs to 60 lbs. Mat 10 is preferably made from well-known one piece injection molding manufacturing process and is shown with an interior cellular structure formed by vertical walls within the mat with the walls of one cell indicated by 30, 30a, 30b and 30c. The interior of mat 10 can be of solid construction or separate inserts of material can fill some or all the cells for greater load bearing strength. The insert material can be any compatible material and is preferably the same material as the mat. The inserts are sized and shaped to fit within the cells.

Figure 7:
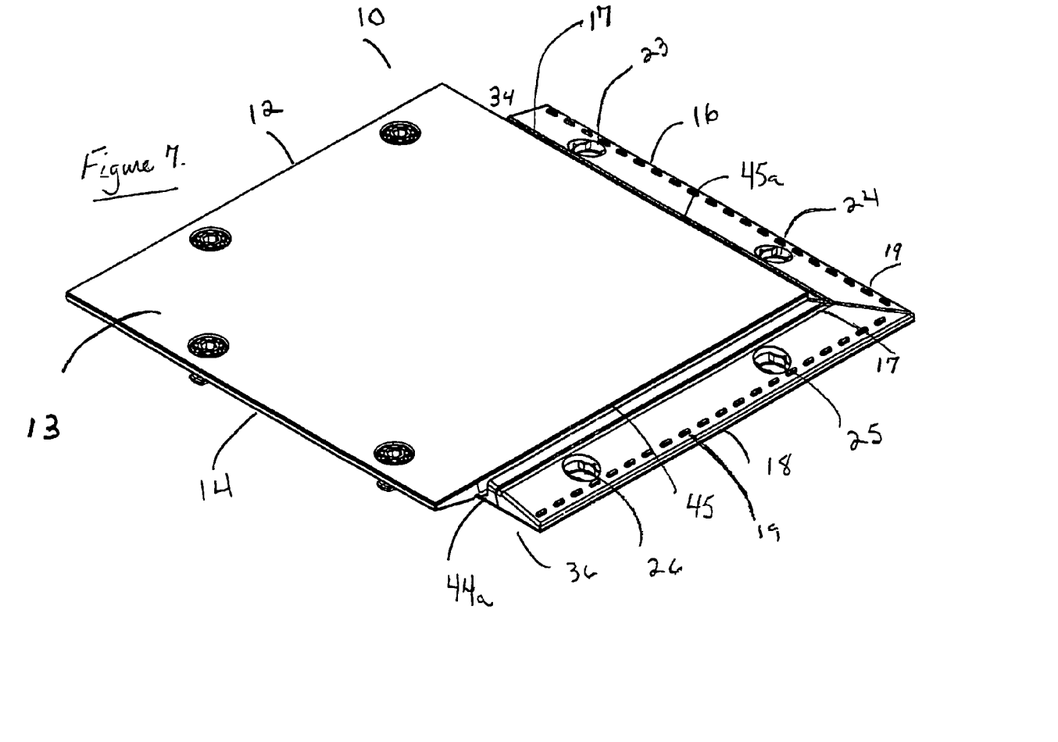
FIG. 7 is a perspective view of mat with top panel and captive pins.
Figure 8:
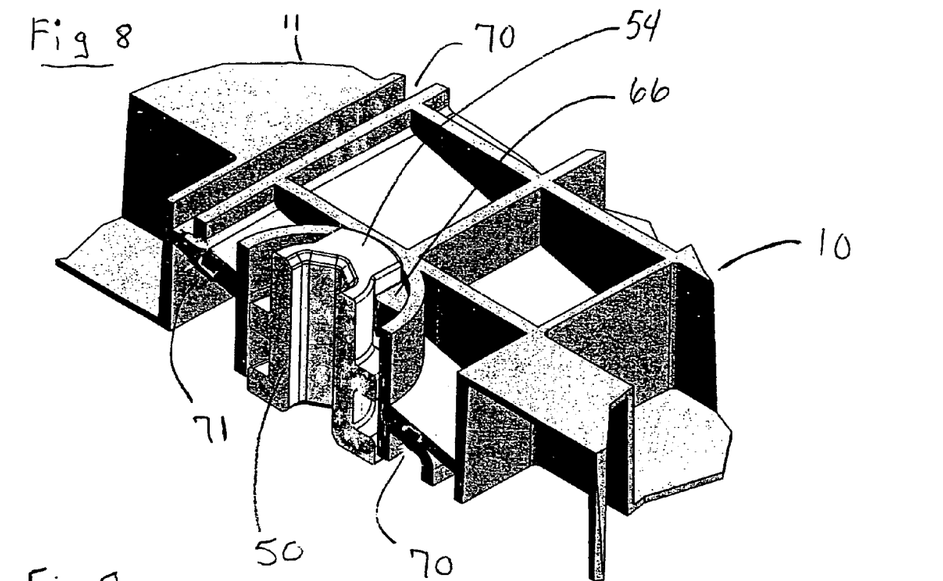
Figure 8A:
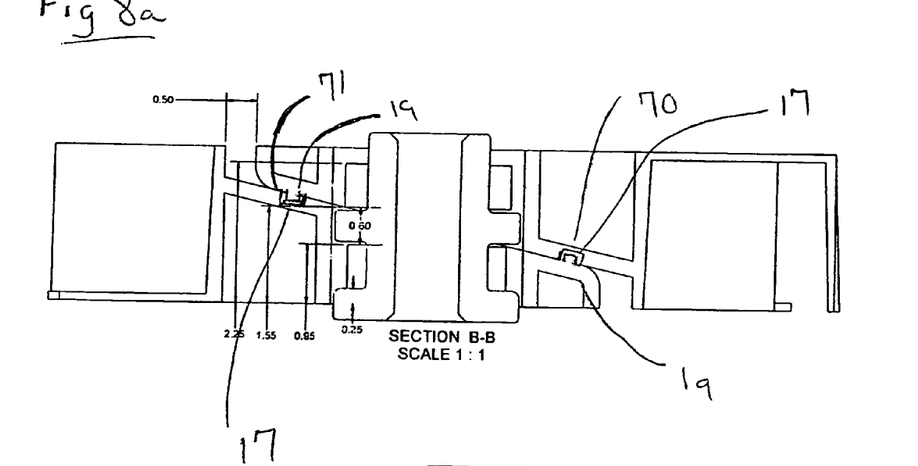

Referring to FIG. 1 and FIG. 7, two adjoining edges about the perimeter of mat 10 being recessed from bottom of mat 10 to form adjoining upper lips 12, 14 and forming lower risers 44, 44a with recessed sloping upper lip 12 adjacent to recessed sloping upper lip 14. The remaining two adjoining edges 16 and 18 about perimeter of mat 10, are recessed from the top to form upper risers 45, 45a and downward sloping lower lips 16, 18. The risers are preferably ½ to ¾ inches in height and the edges of the mat, at the short height of the slope, are approximately ½ to ¾ inches in height Preferably, the mat 10 is generally square shaped, with diagonally opposite corners 34 and 36 removed. Referring to FIG. 1, mat 10 has uniformly spaced openings 21, 22, 23, 24, 25, 26, 27 and 28 in lips. All lips 12, 14, 16, 18 have uniformly sized groove 17 formed by an indent in lips parallel to vertical axis of the riser 44, 44a, 45, 45a of each lip, and mat 10 upper and lower lip, 12, 14, 16, 18 have a uniformly sized interspaced ridges 19 parallel with vertical axis of each lip's riser 44, 44a, 45, 45a, sized and located to form two tongue and groove joints 70, 71 between overlapping lips of adjacent mat which provides for easier assembly and secures the mat from lateral separation as seen in FIGS. 8, 8a. The ridges 19 on the mat 10 lower lip fit in the groove 17 of adjacent mat's 11 overlapping upper lip and the ridges 19 of the overlapping upper lip fit into the groove 19 on the lower lip. The groove is preferably ½ to ⅝ inches wide and with a depth of ⅛ to ¼ inches. The ridges are approximately ¼ inch wide, ¼ inch high and 1 inch long with 1 inch spacing between the ridges. The interspaced ridges 19 allow for mud, debris or other contaminants to be pressed out of the groove 17 on engagement of the tongue and groove joint 70, 71.

Tongue and groove joints are shown in the preferred embodiment; however, any known joint or interlocking joining can be used to secure the overlapping lips. There are many well known means to assemble composite components such as composite integral fit joints, snap fit joints and integral design feature joints in which the joint is held together by material interference with the contacting surfaces. For example, the overlapping lips can be interlocked a mortise and tenon joint. Alternatively and additionally, the mat's overlapping lips can be secured together by any type of fastening device, stakes, bolts, screws, pins, clamps, peg or external fastening means.

The lip section is integrated in the mat's body and is formed during manufacturing injection molding and does not rely on any further assembly.

Figure 4:
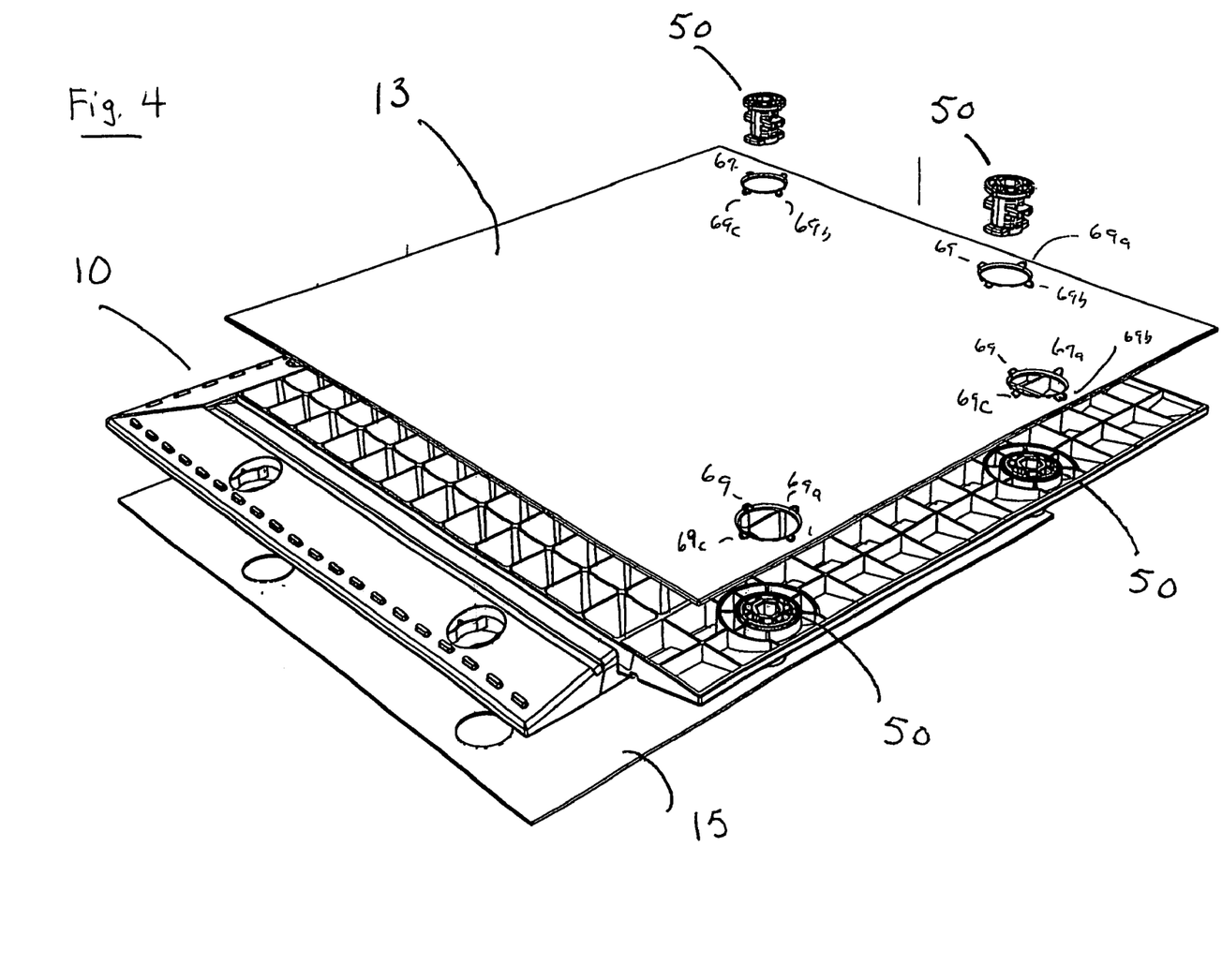
FIG. 4 is an exploded view of a mat, top panel, bottom panel and pins.

Referring to FIG. 4, the mat can be further assembled with a top surface plate 13 and a bottom surface plate 15. The plates 13, 15 are flat and sized and shaped to cover the top and bottom areas of the mat 10. Preferably the plates 13, 15 can be any thickness and are ⅛ to ½ inches in thickness. Preferably the plates 13, 15 are preferably made of the same materials of the mat 10, but could be made of any compatible materials and can be manufactured by well known extrusion methods, injection technologies and molding methods. The plates 13, 15 can be secured to the mats 10 by any well known attachment methods such as adhesives, heat or vibration welding, screws or other fastening means and is preferably attached by heat welding.

The surface plates 13, 15, added to the top and bottoms of each individual mat, protect against dirt, grease or other contaminants in the cellular structure, and these surface plates provide such features as additional strength, non-skid surface, static charge dissipation and/or various colors (or contrasting colors) for use in support surfaces that require markings or other such features. The mats without the surface plates are a functional interlocking mat system.

Figure 2:
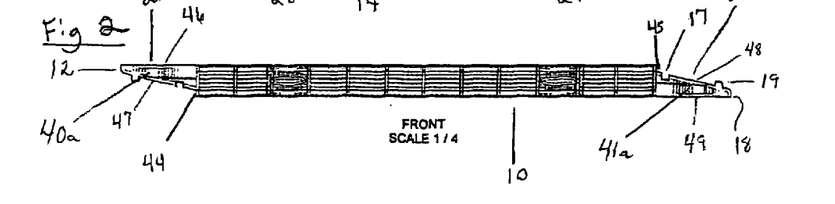
FIG. 2 shows a side elevation view of a mat.

Referring to FIGS. 1 and 2, circular holes or openings 21-28 are at spaced intervals in the lips 12,14,16, 18. At approximately mid-depth of these openings, the walls of the opening have a pair of opposing ledges 40, 40a, 41, 41a forming a slot 35, 36 at mid-depth within openings 21-28. The horizontal axis of the elongated length of the slot 35, 36 is generally perpendicular to the vertical axis of the lips' risers. Referring to FIG. 2, mat 10 opening 21 has countersunk openings formed by ledge 32 and 32a with countersunk top shown as 46 and countersunk bottom as 47 with lower lip hole 26 having countersunk top 48 and countersunk bottom 49 formed by ledge 41 and 41a.

Figure 3:
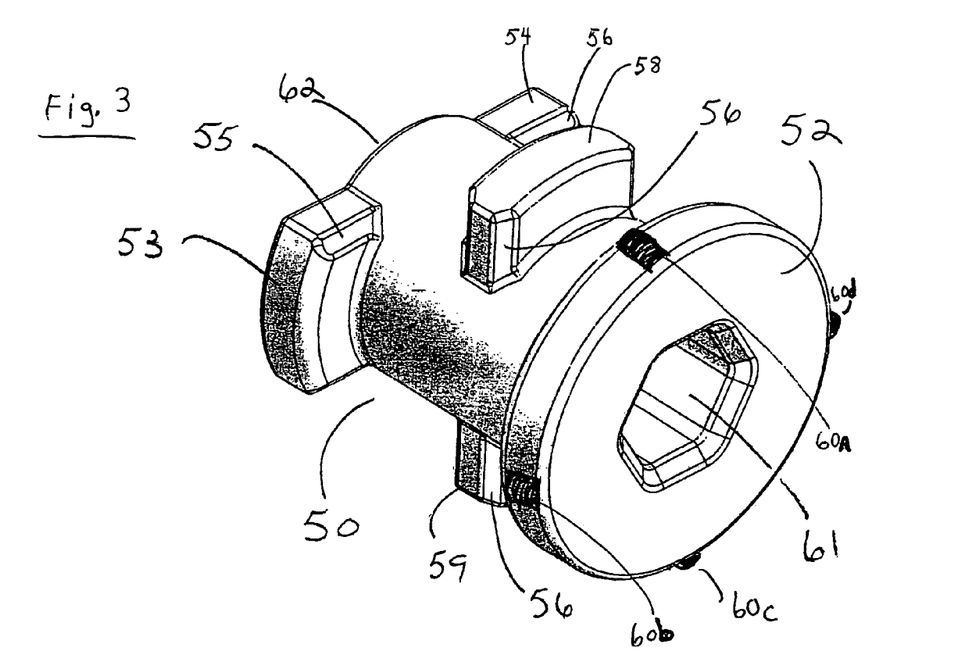
FIG. 3 is a perspective view of the fastening pin with a view of the top of the pin.

Referring to FIGS. 3 and 4, pin 50 has enlarged head 52 and a central longitudinal bore 61 shaped to receive a turning tool. Such tool is preferably an Allen wrench. Longitudinal bore 61 extends completely through pin 50 to bottom at 62. The turning tool can likewise access the pin from the bottom of the pin at 62. Pin 50 has a pair of opposing prongs 58 and 59 extending perpendicular from pin's longitudinal axis, at midbody, and pin 50 has keeper formed by opposing feet 53, 54 at pin bottom 62 extending perpendicular from pin body is longitudinal axis and preferably at a 90 degree angle to horizontal axis of midbody pins 58 and 59. The midbody pins can be offset at an angle sufficient from keeper to separately engage ledges upon rotation. Keeper feet 53 and 54 have beveled edges 55 and 56. Midbody prongs 58 and 59 have beveled top edges 56 and bottom edges 56a that allow for easier pin rotation upon and during the prongs and keepers' contact with the bottom of the ledges.

Figures 5, 5A, 6:
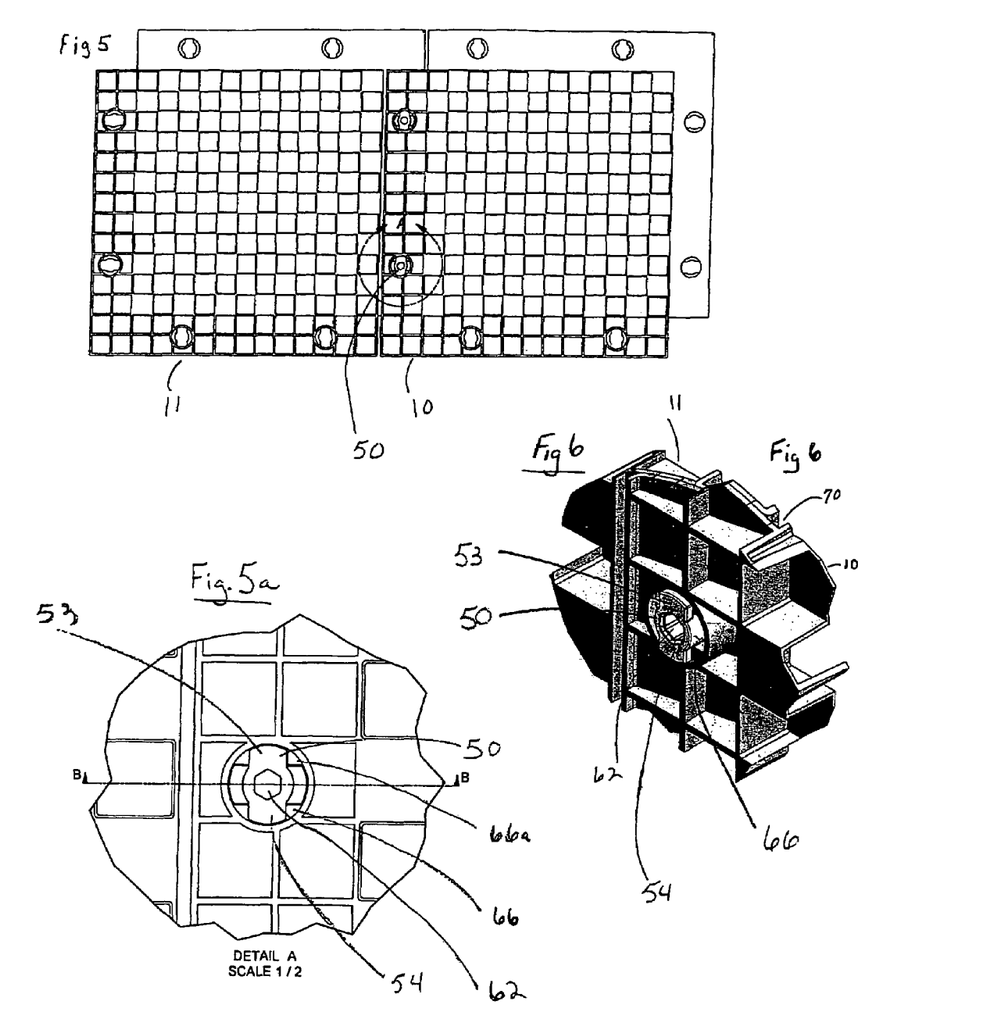
FIG. 5 is a bottom view of two adjacent overlapping mats with two locking pins in place.
FIG. 5a is an enlarged detail of FIG. 5.
FIG. 6 is a perspective view of FIG. 5a of overlapping mats with locking pin in place viewed from bottom of mat system.

The pin 50 is shaped to fit aligned openings in adjacent overlapping maps shown in FIG. 5 and the depth of the pin is designed to approximately match the depth of two overlapping mats as shown in FIGS. 6, 8 and 8a.

The enlarged head 52 of the pin 50 fits into the top counter bored opening 46 of upper lip 14 and the enlarged head 52 prevents the pin 50 from dropping through the mat hole 21. The enlarged head 52 is designed to rest on top of ledges in upper lips, such as 40, 40a. The pin's head 52 fits flush or almost flush with the top of the mat 10 when locked in place as shows in FIGS. 7 and 7a.

Figure 3A:
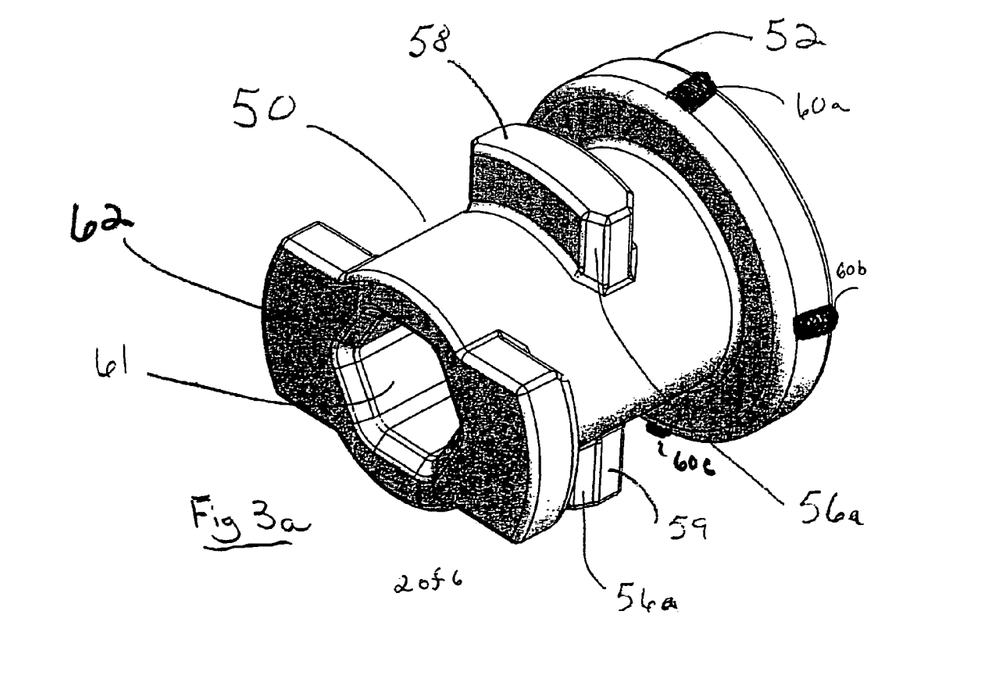
FIG. 3a is a perspective view of the fastening pin with a view of the bottom of the pin.

Referring to FIGS. 3 and 3a and FIG. 4, the enlarged head 52 of pin 50 has longitudinal raised fixed detents 60, 60a, 60b, 60c to engage detent-receiving notches 69, 69a, 69b, 69c which are formed in walls of the top panel 13 or in the walls of the countersunk top openings 21-28, and the interaction of the detents and notches restrict free rotary movement of the pin 50 within the mat 10 and to allow the user to more easily determine the positions of the prongs 53, 54, 58, 59 and the determination of ninety degree turns. Preferably four detents are placed equidistant on the head 52 of the pin 50.

The interaction of detents 60, 60a, 60b, 60c and notches 69, 69a, 69b, 69c restrict free rotation of the pin 50 within the openings of the overlapping top and bottom lips and allows for a type of locking when the detents 60, 60a, 60b, 60c and seated in the notches 69, 69a, 69b, 69c which can be overcome by inserting an Allen wrench into the pin's bore and applying sufficient turning torque to pin to force the detents out of the notches. There can be additional or fewer detents and notches resulting in additional or fewer locking positions. The detents should only be raised a fraction of an inch for optimum restricted rotation.

Figure 7A:
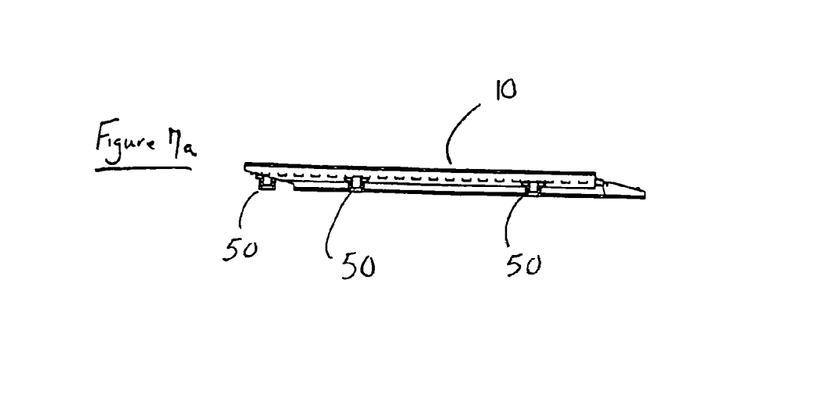
FIG. 7a is a side elevation view of FIG. 7.

In operation, the pin 50 is placed or positioned with the keeper feet 53, 54 fitting through the slot 35 in opening 21, 22 of upper lip 12, 14, and upon insertion of keeper through the upper lip 12, 14 slot 35, the midbody prongs 58, 59 contact the top of the upper lip's ledges 40, 40a. Upon rotary motion ninety degrees clockwise or counterclockwise of the pin 50, the midbody prongs 58, 59 are positioned to fit through the slot 35 formed by the opposing ledges 40, 40a in the upper lips and the enlarged head 52 drops flush into top counter bore hole 46. A subsequent rotary ninety degrees clockwise or counterclockwise turn of the pin rotates the midbody prongs 58, 59 under the bottom side of the opposing ledges 40, 40a of the upper lip. With the head 52 of the pin 50 resting on top of the upper lips' ledges 40, 40a and the midbody prongs 58, 59 positioned underneath and contacting the bottom of the upper lip's opposing ledge 40, 40, the pin is captive within the mat and cannot fall out of the mat as shown in FIGS. 4, 7 and 7a.

Assembly of the interlocking mat system occurs when the top mat 10 is placed on the downward sloping lip 16, 18 of an adjacent mat 11 as shown in FIGS. 5, 5a, and 6. The pin's 50 keeper feet 53, 54 are able to pass through the slot formed by the pair of opposing ledges in the opening of the lower lip of the adjacent mat 11. With a ninety degree clockwise or counterclockwise turn of the pin 50, the pin's keeper feet 53, 54 rotate underneath the bottom side of the pair of opposing ledges 41, 41a of the lower lip of the adjacent mat 11. The mats 10, 11 are fastened together by the bottom of the enlarged head 52 of the pin 50 contacting the top surface of the pair of ledges 40, 40a of the upper lip 12, 14 of a mat 10 and the keeper feet 53, 54 contacting the bottom surface of the pair of ledges 40, 41a of the lower lip 16, 18 of the adjacent mat 11.

Referring to FIG. 8a, in this locked position, the pin's midbody prongs 59 and 58 are disposed between the upper lip ridges 33 and 33a of mat 10 and the lower lip ridges 66 and 66a of mat 11.

In this locked position, the horizontal axis of the keeper feet 53, 54 extend parallel to the vertical plane of the lip's riser. With the keeper in this configuration, lateral forces on the mats are transmitted to the pin 50 over the length of the keeper feet 53, 54 limiting the potential for shear failure of the keeper feet 53, 54.

The midbody prongs 58, 59 in the locked configuration are positioned perpendicular to the vertical plane of the lip's riser. In this configuration, the midbody prongs 58, 59 counteract compression of the mats by transmitting the lateral forces through one end of the midbody prong through to the opposing midbody prong and into the adjacent mat 11.

Referring to FIG. 6, 8, 8a mats 10 and 11 are overlapped and fastened with pin 50 in a manner that keeper feet 53 and 54 fit underneath ledges 66 and 66a. Overlapping mats 10 and 11 can fit flush, but in the preferred embodiment, the mats edges fit together to allow for a gap 70 for assembly tolerances and thermal expansion.

The mats can be made of various sizes and the preferred embodiment exhibits the necessary strength and durability characteristics while remaining relatively lightweight.

Various changes can be made in the shape, size or arrangement of the parts of the mats and use of equivalent elements or materials may be substituted for those illustrated and described. Features and parts may be reversed and certain features of the invention may be utilized independently from other features, as would be apparent to one skilled in the art, after having benefit of this description.

What is claimed is:

1. An interlocking mat system for temporary support structures comprising:
   a plurality of uniformly sized rigid mats;
   along at least one side and one end of said mats, the perimeter of said mats being sloped upward from the bottom of said mats to form a upper lip;
   at least one opposite side and opposite end of said mats is sloped downward from top of said mats to form a lower lip;
   the angle to which said mat edges are sloped to form said lips being substantially the same thus allowing for the overlapping of said upper and lower lips about the edges of said mat with respective like lower and upper lips of other like mats when placed adjacent thereto for joining therewith by which said overlapping mats form a generally flat continuous top and bottom surface; and,
   said overlapping mats' lips are secured together by an attachment means. wherein the attachment means is a composite integral fit joint, snap fit joint or an integral design feature joint in which the joint is held together by material interference with the contacting surfaces of the overlapping lips. has been inserted.

2. The mat system of claim 1 wherein
said lips have at least one uniformly spaced opening which can be aligned with said opening in said lip of overlapping adjacent mat;
wherein said openings are sized and aligned to allow a fastening device to fit into said aligned overlapped openings and to secure mats together;
said a fastening device can be a pin, a stake, a bolt, clamp, a screw, a clip, a peg or external fastening device.

3. The interlocking mat of claim 1 wherein
said mat is manufactured from one piece molded construction;
a top surface plate and said top surface plate affixed to said mats' top by attachment means;
a bottom surface plate and said bottom surface plate affixed to said mats' bottom by attachment means.

4. A interlocking mat system for temporary support structures comprising:
a plurality of uniformly sized rigid mats;
along at least one side and one end of said mats, the perimeter of said mats being recessed upward from the bottom of said mats to form a upper lip;
wherein at least one opposite side and opposite end of said mats is recessed downward from top of said mats to form a lower lip;
the depth to which said mat edges are recessed to form said lips being substantially the same thus allowing for the overlapping of said upper and lower lips about the edges of said mat with respective like lower and upper lips of other like mats when placed adjacent thereto for joining therewith by which said overlapping mats form a generally flat continuous top and bottom surface;
said upper and lower lips have at least one opening at spaced intervals along said lips to allow for alignment of said openings in said overlapping mats to receive locking pin;
wherein, said opening forms a generally circular hole with a pair of opposing ledges located mid-depth of said opening to form a uniformly positioned slot within said circular opening;
said ledges form a counter-sunk top and a countersunk bottom of said openings for receiving said locking pin;
said locking pin having a rigid structure shaped to be received into said aligned openings and said aligned slots of a pair of said overlapping maps;
said pin having an enlarged head shaped and sized to fit in countersunk top openings of said upper lip;
said pin having a pair opposing prongs at said pin's midbody sized and shaped to fit through said slots and disposed generally perpendicular from the longitudinal axis of said pin and within the longitudinal projected volume of said opening and the top of said midbody prongs disposed below the bottom horizontal plane of said ledges when enlarged head is resting in countersunk top opening on top of said ledges;
said pin having a keeper comprised of a pair of opposing feet at the bottom of said pin and disposed generally perpendicular from the longitudinal axis of said pin and within said longitudinal projected volume of said opening and said keeper angularly disposed from horizontal axis of said midbody prongs; and
said pin being shaped that pin can be placed into said opening of said upper lip with the keeper fitting through said slot in said upper lip and said midbody prongs contacting the top of upper lip ledges;
upon rotary 90 degrees clockwise or counterclockwise turn of the pin, the midbody prongs are positioned to pass through the upper lip's slot and the enlarged head fits flush into the upper lip top counter bore and the midbody prongs are predisposed below the bottom horizontal plane of said upper lip ledges;
a subsequent rotary 90 degrees clockwise or counterclockwise turn of the pin rotates the said midbody prongs within the longitudinal projected volume of said ledges of upper lip fixing the pin into its resident or captive position within said mat;

the mat with the pin in the captive position in the upper lip can be aligned and overlapped with a like opening on the lower lip of an adjacent mat;

said alignment of said opening of the upper lip of said mat and said like opening of said lower lip of said adjacent mat allows said keeper to pass through a like slot of said lower lip of said adjacent mat and said keeper is disposed below the horizontal axis of said ledges of said lower lips;

said pin is shaped that the keeper is rotatable around its longitudinal axis between an unlock position wherein said keeper remains within the longitudinal projected volume of said slot of the lower lip of the adjacent mat, and a locking position, wherein with a 90 degree clockwise or counterclockwise turn of the pin, the keeper is rotated into the longitudinal projected volume of said ledges of the lower lip of the adjacent mat;

said mat and said adjacent mats are fastened together by the enlarged head of the pin contacting the top of the ledges of the upper lip of said mat and the keeper contacting the bottom of the ledges of the lower lip of the adjacent mat.

5. The mat system of claim 4 wherein two adjoining edges about the perimeter of said mats being recessed from the bottom of said mats to form adjoining upper lips and lower risers along one side and one end of said mats;

wherein the remaining two adjoining edges about the perimeter of said mats being recessed from top of said mats to form adjoining lower lips and upper risers along the opposite side and opposite end of said mats;

wherein the depth to which said mat edges are recessed to form said lips about the entire perimeter of said mats being substantially the same such that two diagonally opposite corners of said mat are removed in the areas where said upper lips would otherwise intersect with said lower lips, thus allowing for the overlapping of said upper and lower lips about the edges of said mat with respective lower and upper lips of other like mats when placed adjacent thereto for joining therewith by which said overlapping mats have a generally flat continuous top and bottom surface;

said upper lips slope downward from edge of said mat to lower risers and said lower lips slope upward from edge of said mat to upper risers;

said overlapping mats' lips are secured together by a composite integral fit joint, a snap fit joint or an integral design feature joint in which the joint is held together by material interference with the contacting surfaces of the overlapping lips to produce a flush surface between the adjoining lips and providing a continuous flat upper and lower mat surface.

6. The mat system of claim 4 wherein inner body of the mat having a cellular structure formed by a series of vertical walls within the mat's body;

a top surface plate and said top surface plate affixed to said mats' top by attachment means;

a bottom surface plate and said bottom surface plate affixed to said mats' bottom by attachment means.

7. The mat system of claim 4 wherein said enlarged head has at least one longitudinally raised detent on said head's outer circumference and the walls forming said lip opening has at least one detent receiving notch which contacts and receives said raised detent on said enlarged head during rotation of said pin relative to said lip opening to restrict free rotation of said pin.

8. The mat system of claim 4 wherein said upper and lower lips have a uniformly sized groove formed by an indent in each said lip disposed parallel to the vertical plane of each said lips' riser;

each said upper and lower lips have a uniformly sized ridge parallel to the vertical plane of each said lips' said riser and wherein said ridges and said grooves are sized and positioned to form two tongue and groove joints between said overlapping lips of said adjacent mats in which said ridge of the upper lip engages and fits into a corresponding groove of the adjacent mat's lower lip and in which the groove in the upper lip fits and engages in a corresponding ridge in the adjacent mat's lower lip to produce a flush surface between the adjoining lips and providing a generally flat continuous top and bottom surface.

9. The mat system of claim 8 wherein said tongue and groove joints are located on said lips in a manner and position to allow for an assembly tolerance gap between edge of said top lip of said mat and said upper riser of said adjacent overlapping mat.

10. The mat system of claim 8 wherein said ridges are interspaced to allow for displacement of contaminants in said grooves when the ridges engage said grooves in said tongue and groove manner.

11. An interlocking mat system comprising:

a plurality of uniformly sized rigid mats;

wherein two adjoining edges about the perimeter of said mats being recessed from the bottom to form adjoining upper lips and lower risers along one side and one end of said mats;

the remaining two adjoining edges about the perimeter of said mat being recessed from top to form adjoining lower lips and upper risers along the opposite side and opposite end of said mats;

the depth to which said mat edges are recessed to form said lips about the entire perimeter of said mat thereof being substantially the same such that two diagonally opposite corners of said mat are removed in the areas where said upper lips would otherwise intersect with said lower lips, thus allowing for the overlapping of said upper and lower lips about the edges of said mat with respective like lower and upper lips of other like mats when placed adjacent thereto for joining therewith;

said upper and lower lips have a uniformly sized groove formed by an indent in disposed parallel to the vertical plane of each lips' riser;

each said upper and lower lips have a uniformly sized ridge disposed parallel to the vertical plane of each said lips said riser and wherein said ridges and said grooves are sized and positioned to form two tongue and groove joints between said overlapping lips of said adjacent mats in which said ridge of the upper lip engages and fits into a corresponding groove in said adjacent mat's lower lip in which the groove in the upper lip fits and engages in a corresponding ridge in the adjacent mat's lower lip to produce a flush surface between the adjoining lips and providing a continuous flat upper and lower mat surface;

said upper and lower lips have at least one opening at spaced intervals along said lips to allow for alignment of said openings in said overlapping mats to receive locking pin; and wherein, said opening forms a generally circular hole with a pair of opposing ledges located mid-depth of said opening to form a uniformly positioned slot within said circular opening;

said ledges form a counter-sunk top and a countersunk bottom of said openings for receiving said locking pin;

said locking pin having a rigid structure shaped to be received into said aligned openings and said aligned slots of a pair of said overlapping maps;

said pin having an enlarged head shaped and sized to fit in countersunk top openings of said upper lip;

said pin having a pair opposing prongs at said pin's midbody sized and shaped to fit through said slots and disposed generally perpendicular from the longitudinal axis of said pin and within the longitudinal projected volume of said opening and the top of said midbody prongs disposed below the bottom horizontal plane of said ledges when enlarged head is resting in countersunk top opening on top of said ledges;

said pin having a keeper comprised of a pair of opposing feet at the bottom of said pin and disposed generally perpendicular from the longitudinal axis of said pin and within said longitudinal projected volume of said opening and said keeper angularly disposed from horizontal axis of said midbody prongs;

said pin being shaped that pin can be placed into said opening of said upper lip with the keeper fitting through said slot in said upper lip and said midbody prongs contacting the top of upper lip ledges;

upon rotary 90 degrees clockwise or counterclockwise turn of the pin, the midbody prongs are positioned to pass through the upper lip's slot and the enlarged head fits flush into the upper lip top counter bore and the midbody prongs are predisposed below the bottom horizontal plane of said upper lip ledges;

a subsequent rotary 90 degrees clockwise or counterclockwise turn of the pin rotates the said midbody prongs within the longitudinal projected volume of said ledges of upper lip fixing the pin into its resident or captive position within said mat;

the mat with the pin in the captive position in the upper lip can be aligned and overlapped with a like opening on the lower lip of an adjacent mat;

said alignment of said opening of the upper lip of said mat and said like opening of said lower lip of said adjacent mat allows said keeper to pass through a like slot of said lower lip of said adjacent mat and said keeper is disposed below the horizontal axis of said ledges of said lower lips;

said pin is shaped that the keeper is rotatable around its longitudinal axis between an unlock position wherein said keeper remains within the longitudinal projected volume of said slot of the lower lip of the adjacent mat, and a locking position, wherein with a 90 degree clockwise or counterclockwise turn of the pin, the keeper is rotated into the longitudinal projected volume of said ledges of the lower lip of the adjacent mat;

said mat and said adjacent mats are fastened together by the enlarged head of the pin contacting the top of the ledges of the upper lip of said mat and the keeper contacting the bottom of the ledges of the lower lip of the adjacent mat;

said enlarged head has at least one longitudinally raised detent on said head's outer circumference and the walls forming said lip opening has at least one detent receiving notch which contacts and receives said raised detent on said enlarged head during rotation of said pin relative to said lip opening to restrict free rotation of said pin.

12. The interlocking mat of claim 11 wherein said mats are manufactured from one piece molded construction;

inner body of the mat having a cellular structure formed by a series of vertical walls within the mat's body;

a top surface plate and said top surface plate affixed to said mats' top by attachment means; and a bottom surface plate and said bottom surface plate affixed to said mats' bottom by attachment means.

13. A interlocking mat system for temporary support structures comprising:

a plurality of uniformly sized rigid mats;

said mats are manufactured from one piece molded construction;

a top surface plate and said top surface plate affixed to said mats' top by attachment means; and a bottom surface plate and said bottom surface plate affixed to said mats' bottom by attachment means.

two adjoining edges about the perimeter of said mats being recessed from the bottom of said mats to form adjoining upper lips and lower risers along one side and one end of said mats;

wherein the remaining two adjoining edges about the perimeter of said mats being recessed from top of said mats to form adjoining lower lips and upper risers along the opposite side and opposite end of said mats;

wherein the depth to which said mat edges are recessed to form said lips about the entire perimeter of said mats being substantially the same such that two diagonally opposite corners of said mat are removed in the areas where said upper lips would otherwise intersect with said lower lips, thus allowing for the overlapping of said upper and lower lips about the edges of said mat with respective lower and upper lips of other like mats when placed adjacent thereto for joining therewith by which said overlapping mats have a generally flat continuous top and bottom surface;

said upper lips slope downward from edge of said mat to lower risers and said lower lips slope upward from edge of said mat to upper risers;

said overlapping mats' lips are secured together by a composite integral fit joint, a snap fit joint or an integral design feature joint in which the joint is held together by material interference with the contacting surfaces of the overlapping lips to produce a flush surface between the adjoining lips and providing a generally continuous flat upper and lower mat surface.

said upper and lower lips have openings at spaced intervals along said lips to allow for alignment of said openings in said overlapping mats to receive a captive locking pin.

* * * * *